3,264,323
COUMARIN DERIVATIVE
Daniel Kaminsky, East Paterson, and Robert I. Meltzer, Rockaway, N.J., assignors to Warner-Lambert Pharmaceutical Company, Morris Plains, N.J., a corporation of Delaware
No Drawing. Filed Dec. 17, 1963, Ser. No. 331,112
1 Claim. (Cl. 260—343.2)

This invention relates to new and novel coumarin derivatives. More particularly, this invention relates to β-acetyl-4-hydroxycoumarin derivatives of the formula:

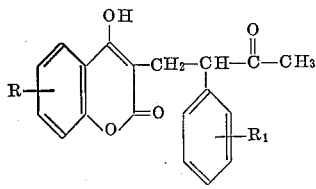

wherein R may be hydrogen, lower alkyl such as methyl, ethyl, propyl, hexyl and the like, or aryl such as phenyl and phenethyl, and $R_1$ may be hydrogen, halogen such as chlorine, bromine or iodine, lower alkoxy such as methoxy, ethoxy, propoxy and the like or nitro. The symbols R and $R_1$ used hereinafter in the specification and in the claim have the same meaning as defined. This invention also includes within its scope a novel process for the production of these novel coumarin derivatives as well as novel intermediates useful for their production.

The compounds of this invention exhibit potent anticoagulant properties and are therefore useful where anticoagulant therapy is required. They are thus useful in the management of intravascular clots, thrombotic occlusion of cerebral arteries, pulmonary embolism and the like. They possess additional properties and advantages over known anti-coagulants in that their anticoagulant activity has a rapid yet very smooth onset and a long duration. In addition, these novel coumarin derivatives are useful as intermediates for the production of other coumarin derivatives.

In accordance with our invention, the above compounds are prepared by reacting together substituted 4-hydroxycoumarin, formaldehyde and substituted phenylacetone in an inert solvent. The reaction may be presented by the equation:

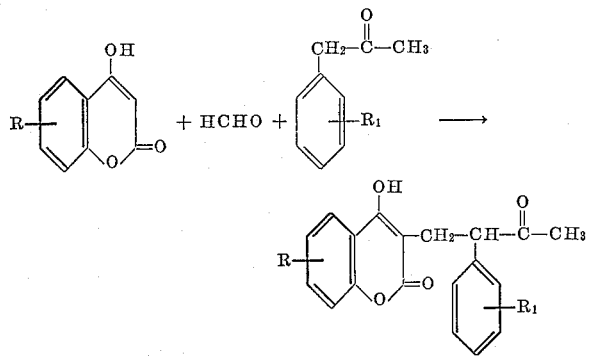

The reactants are generally employed at equimolar ratios. Pyridine has been found to be the preferred reaction medium although other inert solvents such as dimethylformamide or the like may be employed. The reaction is effected at reflux temperature of the solvent for for about 2 to 4 hours. Thus when pyridine is the medium, a temperature range of 110° to 120° C. over a period of 4 hours is used. The reaction product formed is recovered by removal of the solvent such as by evaporation under vacuum. Purification of the reaction product may be effected by extracting an ethereal solution of the reaction product with 5% aqueous solution of sodium hydroxide followed by extraction with water. The basic extracts are combined and when acidified yield a precipitate. The precipitated product thus obtained is then recrystallized from ethanol, aqueous acetic acid or ethyl acetate to give an analytically pure product.

For therapeutic use, the novel compounds of this invention may be combined with conventional pharmaceutical carriers to give dosage forms such as tablets, solutions, pills, capsules, parenteral solution and the like.

In order to further illustrates this invention, the following examples are given in which the temperatures stated are in degrees centigrade.

EXAMPLE 1

3-(β-acetyl-p-chlorophenethyl)-4-hydroxycoumarin

A mixture of 0.9 g. (0.03 mole) of paraformaldehyde, 5.6 g. (0.033) mole of p-chlorophenylacetone and 100 ml. of pyridine is allowed to react for 15 minutes, at which time 49 g. (0.03 mole) 4-hydroxycoumarin is added, the mixture swirled and put aside overnight. The mixture is gently refluxed for 4 hours and again set aside. The following day, the pyridine is removed under vacuum and the residue dissolved in 200 ml. ether. The ether layer is extracted with three 100 ml. portions of 5% NaOH and then with 100 ml. water. The combined aqueous phase is treated with Super-Cel, charcoal and filtered. The clear filtrate is acidified to about pH 1 and allowed to stand overnight to complete precipitation. On filtration, approximately 10 g. of crude tan solid is obtained. This solid is dissolved in 200 ml. boiling 70% ethanol, charcoaled, filtered, diluted with 1000 ml. water, cooled in ice for a few hours and filtered to yield 7.3 g. of 3-(β-acetyl-p-chlorophenethyl)-4-hydroxycoumarin as a tan solid, M.P. 147–149°. Five recrystallizations from 50% aqueous acetic acid yielded an almost colorless analytical material, M.P. 155–157°.

Analysis for $C_{19}H_{15}ClO_4$—Calcd: C, 66.57; H, 4.41. Found: C, 66.61; H, 4.50.

EXAMPLE 2

3-(β-acetylphenethyl)-4-hydroxycoumarin

In the same way as described in Example 1, 0.03 mole of paraformaldehyde, 0.03 mole of 4-hydroxycoumarin and 0.03 mole of phenylacetone in 100 ml. pyridine is allowed to react together to give 3-(β-acetylphenethyl)-4-hydroxycoumarin in the form of almost colorless crystals, M.P. 170–173°.

Analysis for $C_{19}H_{16}O_4$—Calcd: C, 74.01; H, 5.34 Found: C, 74.02; H, 5.38.

EXAMPLE 3

3-(β-acetylphenethyl)-4-hydroxy-6-methylcoumarin

In the same way as described in Example 1, 4-hydroxy-6-methylcoumarin is reacted with phenylacetone and paraformaldehyde in pyridine to give 3-(β-acetylphenethyl)-4-hydroxy-6-methylcoumarin which is obtained in the form of colorless crystals, M.P. 172–173°.

Analysis for $C_{20}H_{18}O_4$—Calcd: C, 74.52; H. 5.63. Found: C, 74.36; H. 5.73.

EXAMPLE 4

3-(β-acetylphenethyl)-4-hydroxy-7-methylcoumarin

In the same way as described in Example 1, 4-hydroxy-7-methylcoumarin is reacted with paraformaldehyde and phenylacetone to give 3-(β-acetylphenethyl)-4-hydroxy-7-methylcoumarin, M.P. 172–173°.

Analysis for $C_{20}H_{18}O_4$—Calcd: C, 74.52; H, 5.63. Found: C, 74.60; H, 5.65.

EXAMPLE 5

*3-(β-acetylphenethyl)-4-hydroxy-8-methylcoumarin*

In the same way as described in Example 1, 4-hydroxy-8-methylcoumarin is reacted with phenylacetone and paraformaldehyde in pyridine to give 3-(β-acetylphenethyl)-4-hydroxy-8-methylcoumarine, M.P. 138–139°.

Analysis for $C_{20}H_{18}O_4$—Calcd: C, 74.52; H, 5.63. Found: C, 74.49; H, 5.54.

EXAMPLE 6

*3-(β-acetylphenethyl)-4-hydroxy-8-phenylcoumarin*

In the same way as described in Example 1, 4-hydroxy-8-phenylcoumarin is reacted with phenylacetone and paraformaldehyde in pyridine to give 3-(β-acetylphenethyl)-4-hydroxy-8-phenylcoumarine, M.P. 165–167°.

Analysis for $C_{25}H_{20}O_4$—Calcd: C, 78.11; H, 5.24. Found: C, 77.84; H, 5.07.

EXAMPLE 7

*3-(β-acetyl-o-methoxyphenethyl)-4-hydroxycoumarin*

In the same way as described in Example 1, 4-hydroxycoumarin is reacted with o-methoxyphenethyl, phenylacetone and paraformaldehyde to give 3-(β-acetyl-o-methoxyphenethyl)-4-hydroxycoumarin, MP. 133–136°.

Analysis for $C_{20}H_{18}O_5$—Calcd: C, 70.99; H, 5.36. Found: C, 70.91; H. 5.15.

EXAMPLE 8

*3-(β-acetyl-m-methoxyphenethyl)-4-hydroxycoumarin*

In the same way as described in Example 1, 4-hydroxycoumarin is reacted with m-methoxyphenethyl, phenylacetone and paraformaldehyde to give 3-(β-acetyl-m-methoxyphenethyl)-4-hydroxycoumarin, MP. 123–125°.

Analysis for $C_{20}H_{18}O_5$—Calcd: C, 70.99; H, 5.36. Found: C, 70.90; H, 5.61.

EXAMPLE 9

*3-(β-acetyl-p-methoxyphenethyl)-4-hydroxycoumarin*

In the same way as described in Example 1, 4-hydroxycoumarin is reacted with p-methoxyphenethyl, phenylacetone and paraformaldehyde to give 3-(β-acetyl-p-methoxyphenethyl)-4-hydroxycoumarin, M.P. 174–175°.

Analysis for $C_{20}H_{18}O_5$—Calcd: C, 70.99; H, 5.36. Found: C, 71.23; H, 5.39.

EXAMPLE 10

*3-(β-acetyl-p-nitrophenethyl)-4-hydroxycoumarin*

In the same way as described in Example 1, 4-hydroxycoumarin reacts with p-nitrophenethylacetone, and paraformaldehyde to give 3-(β-acetyl-p-nitrophenethyl)-4-hydroxycoumarin, M.P. 204–206°.

Analysis for $C_{19}H_{15}NO_6$—Calcd: C, 64.58; H, 4.28. Found: C, 64.78; H, 4.36.

EXAMPLE 11

*3-(β-acetyl-p-chlorophenethyl)4-hydroxy-7-methylcoumarin*

In the same way as described in Example 1, 4-hydroxy-7-methylcoumarin is reacted with p-chlorophenylacetone and paraformaldeyhde in pyridine to give 3-(β-acetyl-p-chlorophenethyl)-4-hydroxy-7-methylcoumarin, M.P. 152–154°.

Analysis for $C_{20}H_{17}ClO_4$—Calcd: C, 67.32; H, 4.80. Found: C, 67.18; H, 5.03.

EXAMPLE 12

*3-(β-acetyl-p-methoxyphenethyl)-4-hydroxy-7-methylcoumarin*

In the same way as described in Example 1, 4-hydroxy-7-methylcoumarin react with p-methoxy, phenylacetone and paraformaldehyde in pyridine to give 3-(β-acetyl-p-methoxyphenethyl)-4-hydroxy-7-methylcoumarin, M.P. 160–162°.

Analysis for $C_{21}H_{20}O_5$—Calcd: C, 71.58; H, 5.72. Found: C, 71.55; H, 5.87.

EXAMPLE 13

*3-(β-acetyl-p-nitrophenethyl)-4-hydroxy-7-methylcoumarin*

In the same way as described in Example 1, 4-hydroxy-7-methylcoumarin is reacted with p-nitrophenylacetone and paraformaldehyde in pyridine to give 3-(β-acetyl-p-nitrophenethyl)-4-hydroxy-7-methylcoumarin, M.P. 204–205°.

Analysis for $C_{20}H_{17}NO_6$—Calcd: C, 65.39; H, 4.66. Found: C, 65.26; H, 4.70.

EXAMPLE 14

*3-(β-acetyl-p-chlorophenethyl)-4-hydroxy-8-methylcoumarin*

In the same way as described in Example 1, 4-hydroxy-8-methylcoumarin is reacted with p-chlorophenylacetone and paraformaldehyde to give 3-(β-acetyl-p-chlorophenethyl)-4-hydroxy-8-methylcoumarin in pyridine, M.P. 144–145°.

Analysis for $C_{20}H_{17}ClO_4$—Calcd: C, 67.32; H, 4.80. Found: C, 67.35; H, 4.85.

EXAMPLE 15

*3-(β-acetyl-p-methoxyphenethyl)-4-hydroxy-8-methylcoumarin*

In the same way as described in Example 1, 4-hydroxy-8-methoxycoumarin is reacted with p-methoxyphenylacetone and paraformaldehyde to give 3-(β-acetyl-p-methoxyphenethyl)-4-hydroxy-8-methylcoumarin in pyridine, M.P. 142–145°.

Analysis for $C_{21}H_{20}O_5$—Calcd: C, 71.57; H, 5.72. Found: C, 71.41; H, 5.85.

It is to be understood that the foregoing detailed description is given merely by way of illustration and that many variations may be made therein without departing from the spirit of our invention.

Having described our invention, what we desire to secure by Letters Patent is:

We claim:

3-(β-acetylphenethyl)-4-hydroxy-8-phenylcoumarin.

References Cited by the Examiner

UNITED STATES PATENTS

| | | | |
|---|---|---|---|
| 2,601,308 | 6/1952 | Lovas | 260—343.2 |
| 2,648,682 | 8/1953 | Stoll et al. | 260—343.2 |

FOREIGN PATENTS 590,158  1/1960  Canada.

OTHER REFERENCES

Royals: Advanced Organic Chemistry, Prentice Hall, Inc., Englewood Cliffs, N. J. (1954), pages 780, 781 and 831.

Simons: Fluorine Chemistry, Academic press, New York (1950), page 402.

Henne et al.: Journal American Chemical Society, vol. 58 (1936), page 882.

Chmielewska et al.: Chemical Abstracts, volume 54 (1960), page 16450b.

WALTER A. MODANCE, *Primary Examiner.*

NICHOLAS S. RIZZO, JOHN D. RANDOLPH,
*Examiners.*

J. A. PATTEN, *Assistant Examiner.*